(12) United States Patent
Egawa

(10) Patent No.: US 10,914,453 B2
(45) Date of Patent: Feb. 9, 2021

(54) WAVELENGTH CONVERSION DEVICE, ILLUMINATION DEVICE, AND PROJECTOR

(71) Applicant: SEIKO EPSON CORPORATION, Tokyo (JP)

(72) Inventor: Akira Egawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/767,106

(22) PCT Filed: Oct. 19, 2016

(86) PCT No.: PCT/JP2016/004634
§ 371 (c)(1),
(2) Date: Apr. 9, 2018

(87) PCT Pub. No.: WO2017/073035
PCT Pub. Date: May 4, 2017

(65) Prior Publication Data
US 2019/0072243 A1    Mar. 7, 2019

(30) Foreign Application Priority Data
Oct. 26, 2015    (JP) .................. 2015-210052

(51) Int. Cl.
*F21S 2/00*    (2016.01)
*F21V 7/22*    (2018.01)
(Continued)

(52) U.S. Cl.
CPC ............... *F21V 7/26* (2018.02); *F21S 2/005* (2013.01); *F21V 9/20* (2018.02); *F21V 9/45* (2018.02);
(Continued)

(58) Field of Classification Search
CPC ............ G03B 21/204; G03B 21/00–64; G02B 26/008; F21V 13/14; F21V 9/30;
(Continued)

(56) References Cited

U.S. PATENT DOCUMENTS

2009/0284148 A1    11/2009    Iwanaga
2011/0149549 A1    6/2011    Miyake
(Continued)

FOREIGN PATENT DOCUMENTS

JP    2009-277516 A    11/2009
JP    2011-129406 A    6/2011
(Continued)

OTHER PUBLICATIONS

Dec. 27, 2016 International Search Report issued in International Patent Application No. PCT/JP2016/004634.

*Primary Examiner* — Christina A Riddle
*Assistant Examiner* — Christopher A Lamb, II
(74) *Attorney, Agent, or Firm* — Oliff PLC

(57) ABSTRACT

A wavelength conversion device in which a wavelength conversion element less easily comes off a substrate. A wavelength conversion device includes a substrate capable of rotating around a rotation axis, a wavelength conversion element provided around the rotation axis on one surface side of the substrate, and a fixing member that fixes the wavelength conversion element to the substrate. The wavelength conversion element includes a first surface opposed to the one surface of the substrate, a second surface on the opposite side of the first surface, and a first side surface section that connects the first surface to the second surface. The fixing member is in contact with the first side surface section in at least a part of the first side surface section when viewed from a direction parallel to the rotation axis.

11 Claims, 5 Drawing Sheets

(51) Int. Cl.
*F21V 9/20* (2018.01)
*F21V 9/40* (2018.01)
*G03B 21/20* (2006.01)
*H04N 5/74* (2006.01)
*F21V 7/26* (2018.01)
*H04N 9/31* (2006.01)
*F21V 14/04* (2006.01)
*F21V 9/45* (2018.01)
*F21Y 115/30* (2016.01)

(52) U.S. Cl.
CPC ............ *F21V 14/04* (2013.01); *G03B 21/204* (2013.01); *H04N 5/74* (2013.01); *H04N 9/3126* (2013.01); *H04N 9/3179* (2013.01); *F21Y 2115/30* (2016.08)

(58) Field of Classification Search
CPC .... F21V 9/32; F21V 7/00–30; F21Y 2115/30; F21K 9/64; H04N 9/31–3197
See application file for complete search history.

(56) References Cited

U.S. PATENT DOCUMENTS

| | | | |
|---|---|---|---|
| 2012/0106126 A1 | 5/2012 | Nojima et al. | |
| 2013/0003347 A1* | 1/2013 | Maemura | H01L 33/507 362/84 |
| 2014/0028981 A1* | 1/2014 | Matsubara | G03B 21/2073 353/20 |
| 2014/0327886 A1* | 11/2014 | Kita | G03B 21/204 353/31 |
| 2015/0346594 A1* | 12/2015 | Shimizu | G03B 21/16 353/31 |
| 2016/0061424 A1* | 3/2016 | Hatanaka | F21V 19/005 362/382 |
| 2016/0137918 A1* | 5/2016 | Hori | C09K 11/7731 428/1.1 |
| 2016/0238922 A1* | 8/2016 | Furuyama | G02B 26/008 |
| 2016/0252722 A1 | 9/2016 | Li et al. | |
| 2017/0015901 A1* | 1/2017 | Lenef | G03B 21/204 |

FOREIGN PATENT DOCUMENTS

| | | |
|---|---|---|
| JP | 2011-159555 A | 8/2011 |
| JP | 2011-180353 A | 9/2011 |
| JP | 2012-8177 A | 1/2012 |
| JP | 2012-98438 A | 5/2012 |
| JP | 2013-57850 A | 3/2013 |
| JP | 2013-120713 A | 6/2013 |
| JP | 2013-250481 A | 12/2013 |
| WO | 2015/055089 A1 | 4/2015 |
| WO | 2015/068562 A1 | 5/2015 |

* cited by examiner

WAVELENGTH CONVERSION DEVICE, ILLUMINATION DEVICE, AND PROJECTOR

BACKGROUND

1. Technical Field

The present invention relates to a wavelength conversion device, an illumination device, and a projector.

2. Related Art

In recent years, as an illumination device for a projector, an illumination device in which a rotation fluorescent plate is used has been proposed. The rotation fluorescent plate irradiates, while rotating a substrate on which a phosphor layer is provided, excitation light on the phosphor layer on the substrate to generate fluorescent light and generates illumination light including the fluorescent light. A light source device including a rotation fluorescent plate as described in JP-A-2009-277516. In the rotation fluorescent plate, an annular phosphor layer is provided on a circular transparent substrate.

SUMMARY OF INVENTION

Technical Problem

In the light source device as described in JP-A-2009-277516, when a fixing force of the phosphor layer decreases, the phosphor layer is likely to peel during the rotation of the rotation fluorescent plate and come off the transparent substrate.

SUMMARY

An aspect of the present invention has been devised in order to solve the problem described above, and one of objects of the aspect of the present invention is to provide a wavelength conversion device in which a wavelength conversion element including a phosphor layer less easily comes off a substrate. One of objects of an aspect of the present invention is to provide an illumination device including the wavelength conversion device described above and having high reliability. One of objects of an aspect of the present invention is to provide a projector including the illumination device described above and having high reliability.

In order to achieve the objects, a wavelength conversion device of an aspect of the present invention includes: a substrate capable of rotating around a rotation axis; a wavelength conversion element provided around the rotation axis on one surface side of the substrate; and a fixing member that fixes the wavelength conversion element to the substrate. The wavelength conversion element includes a first surface opposed to the one surface of the substrate, a second surface on an opposite side of the first surface, and a first side surface section that connects the first surface to the second surface. The fixing member is in contact with the first side surface section in at least a part of the first side surface section when viewed from a direction parallel to the rotation axis.

In the wavelength conversion device in the aspect of the present invention, since the wavelength conversion element is fixed from the side of the first side surface section by the fixing member, the wavelength conversion element less easily comes off the substrate.

In the wavelength conversion device in the aspect of the present invention, a part of the fixing member may be provided between the wavelength conversion element and the substrate.

With this configuration, compared with when a part of the fixing member is not provided between the wavelength conversion element and the substrate, it is possible to increase a fixing force between the wavelength conversion element and the substrate.

In the wavelength conversion device in the aspect of the present invention, the fixing member may be in contact with the first side surface section in a plurality of positions when viewed from the direction parallel to the rotation axis.

With this configuration, the wavelength conversion element much less easily comes off.

In the wavelength conversion device in the aspect of the present invention, a portion of the fixing member in contact with the first side surface section may extend to the second surface side and overlap the second surface when viewed from the direction parallel to the rotation axis.

With this configuration, the portion of the fixing member in contact with the first side surface section is turned around to the side of the second surface of the wavelength conversion element. Therefore, compared with when the portion of the fixing member in contact with the first side surface section is not turned around to the side of the second surface of the wavelength conversion element, the wavelength conversion element much less easily comes off.

In the wavelength conversion device in the aspect of the present invention, the wavelength conversion element may have an annular shape and further include a second side surface section opposed to the first side surface section, and the fixing member may be in contact with the second side surface section in at least apart of the second side surface section when viewed from the direction parallel to the rotation axis.

With this configuration, the wavelength conversion element is held by the fixing member from both of the side of the first side surface section and the side of the second side surface section. Therefore, compared with when the fixing member is not in contact with the second side surface section, the wavelength conversion element much less easily comes off.

An illumination device in an aspect of the present invention includes: the wavelength conversion device in the aspect of the present invention; and a light source that emits excitation light for exciting the wavelength conversion element.

With this configuration, since the illumination device includes the wavelength conversion device in the aspect of the present invention, it is possible to realize the illumination device having high reliability.

In the illumination device in the aspect of the present invention, the fixing member may be in contact with the second surface and provided on an outer side of a spot of the excitation light on the second surface.

With this configuration, since the excitation light is not applied on the fixing member, the fixing member is prevented from being damaged by the excitation light.

A projector in an aspect of the present invention includes: the illumination device in the aspect of the present invention; a light modulating device that modulates, according to image information, light emitted from the illumination device; and a projection optical system that projects the light modulated by the light modulating device.

With this configuration, since the projector includes the illumination device in the aspect of the present invention, it is possible to realize the projector having high reliability.

DESCRIPTION OF EXEMPLARY EMBODIMENTS

First Embodiment

Figure 1:
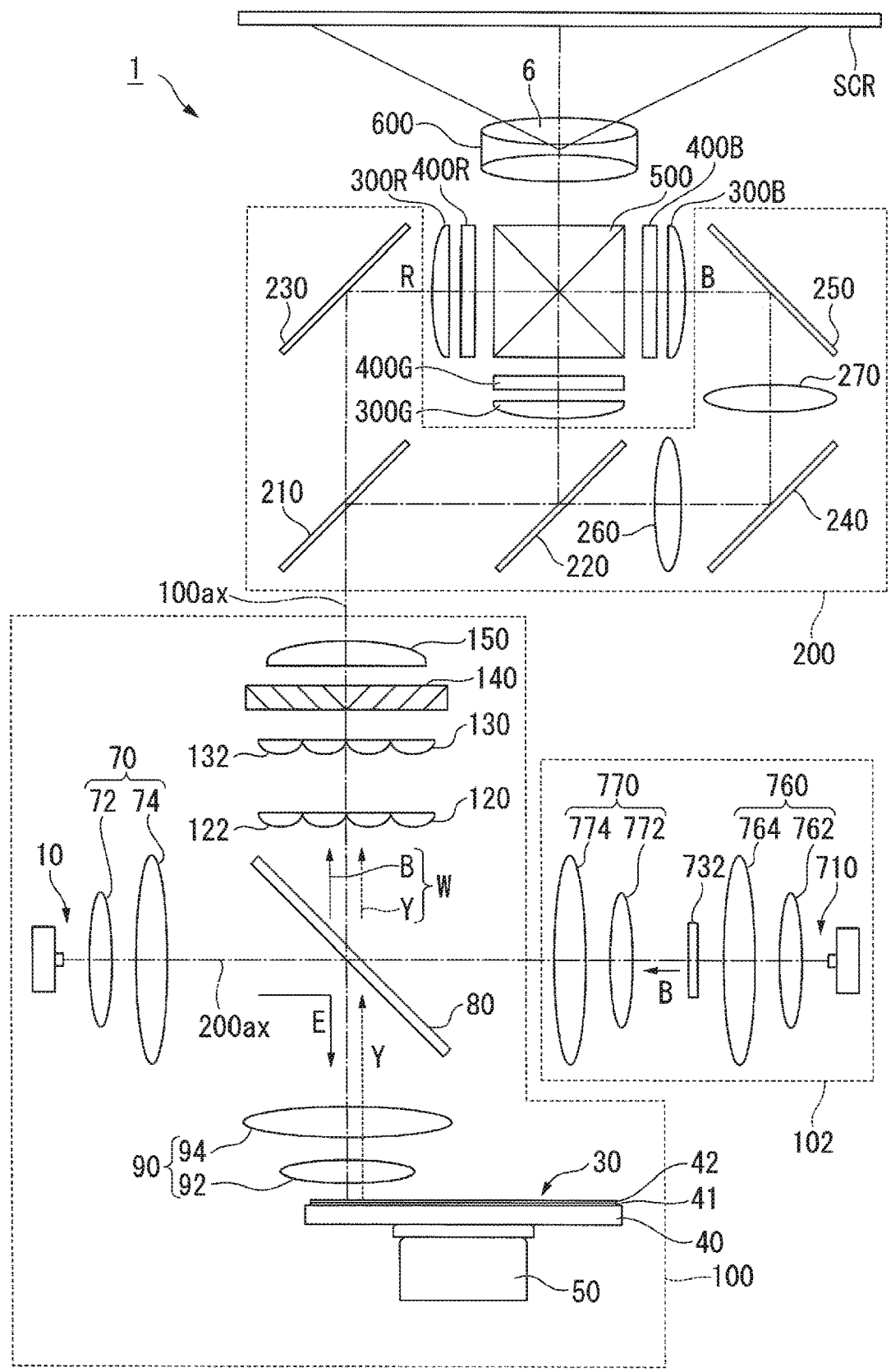
FIG. 1 is a schematic configuration diagram of a projector in an embodiment of the present invention.

A first embodiment of the present invention is explained below with reference to FIG. 1 to FIG. 4.

Note that, in the drawings referred to below, scales of dimensions are shown differently depending on components in order to clearly show the components.

[Projector]

An example of a projector according to this embodiment is explained.

The projector in this embodiment is a projection-type image display apparatus that displays a color video on a screen (a projection surface). The projector includes three liquid crystal light modulating devices corresponding to respective color lights of red light, green light, and blue light. The projector includes, as a light source of an illumination device, a semiconductor laser that can obtain high-luminance and high-power light.

FIG. 1 is a schematic diagram showing an optical system of the projector according to this embodiment.

As shown in FIG. 1, a projector 1 includes a first illumination device 100, a second illumination device 102, a color-separation light-guide optical system 200, a liquid crystal light modulating device 400R, a liquid crystal light modulating device 400G, a liquid crystal light modulating device 400B, across dichroic prism 500, and a projection optical system 600.

The first illumination device 100 in this embodiment corresponds to an illumination device in the claims.

The first illumination device 100 includes a first light source 10, a collimate optical system 70, a dichroic mirror 80, a collimate condensing optical system 90, a rotation fluorescent plate 30, a motor 50, a first lens array 120, a second lens array 130, a polarization conversion element 140, and a superimposition lens 150.

The rotation fluorescent plate 30 in this embodiment corresponds to a wavelength conversion device in the claims.

The first light source 10 is configured from a semiconductor laser that emits blue laser light (a peak of light emission intensity: approximately 445 nm) E in a first wavelength band as excitation light. The first light source 10 may be configured by one semiconductor laser or may be configured by a plurality of semiconductor lasers.

Note that, as the first light source 10, a semiconductor laser that emits blue laser light having a wavelength other than 445 nm, for example, a wavelength of 460 nm can also be used.

The first light source 10 in this embodiment corresponds to a light source in the claims.

The first light source 10 is disposed such that an optical axis 200ax of laser light emitted from the first light source 10 is orthogonal to an illumination optical axis 100ax.

The collimate optical system 70 includes a first lens 72 and a second lens 74. The collimate optical system 70 substantially collimates light emitted from the first light source 10. The first lens 72 and the second lens 74 are configured by convex lenses.

The dichroic mirror 80 is disposed in an optical path leading from the collimate optical system 70 to the collimate condensing optical system 90 to cross each of the optical axis 200ax of the first light source 10 and the illumination optical axis 100ax at an angle of 45°. The dichroic mirror 80 reflects blue light E and transmits yellow fluorescent light Y including red light and green light.

The collimate condensing optical system 90 has a function of condensing the blue light E passed through the dichroic mirror 80 and making the blue light E incident on a wavelength conversion element 42 of the rotation fluorescent plate 30 and a function of substantially collimating fluorescent light emitted from the rotation fluorescent plate 30. The collimate condensing optical system 90 includes a first lens 92 and a second lens 94. The first lens 92 and the second lens 94 are configured by convex lenses.

The second illumination device 102 includes a second light source 710, a condensing optical system 760, a scattering plate 732, and a collimate optical system 770.

The second light source 710 is configured from the same semiconductor laser as the semiconductor laser of the first light source 10 of the first illumination device 100. The second light source 710 may be configured by one semiconductor laser or may be configured by a plurality of semiconductor lasers.

The condensing optical system 760 includes a first lens 762 and a second lens 764. The condensing optical system 760 condenses blue light B emitted from the second light source 710 on the scattering plate 732 or in the vicinity of the scattering plate 732. The first lens 762 and the second lens 764 are configured by convex lenses.

The scattering plate 732 scatters the blue light B emitted from the second light source 710 and generates the blue light B having a light distribution close to a light distribution of the fluorescent light Y emitted from the rotation fluorescent plate 30. As the scattering plate 732, for example, a ground glass formed by an optical glass can be used.

The collimate optical system 770 includes a first lens 772 and a second lens 774. The collimate optical system 770 substantially collimates light emitted from the scattering plate 732. The first lens 772 and the second lens 774 are configured by convex lenses.

The blue light B emitted from the second illumination device 102 is reflected by the dichroic mirror 80 and combined with the fluorescent light Y emitted from the rotation fluorescent plate 30 and transmitted through the dichroic mirror 80 to be white light W. The white light W is made incident on the first lens array 120.

Figure 2:
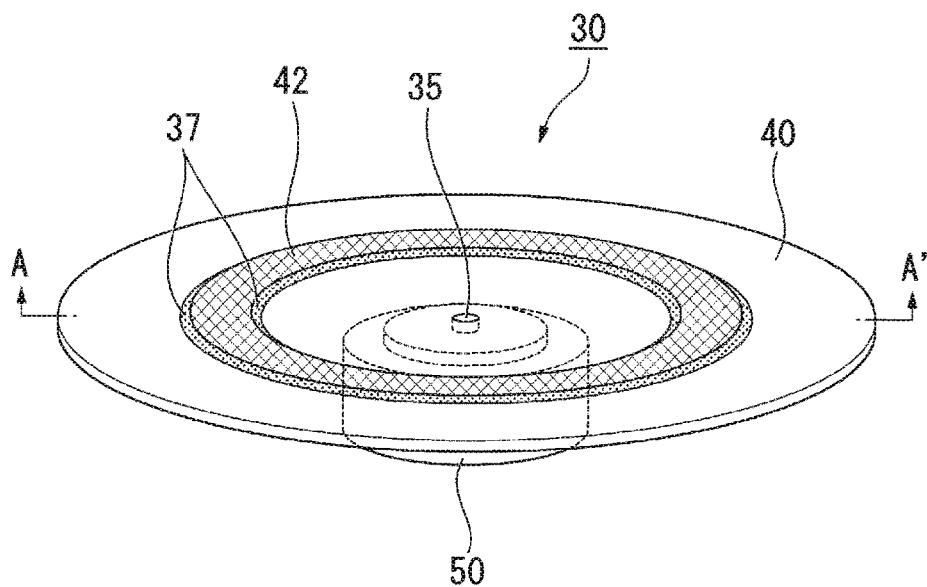
FIG. 2 is a perspective view of a wavelength conversion device in a first embodiment.
Figure 3:
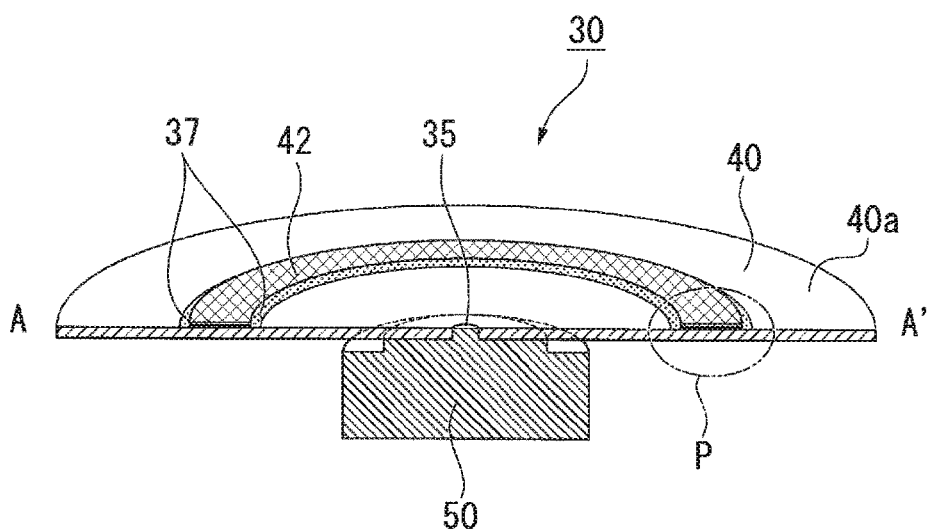
FIG. 3 is a sectional view taken along an A-A' line in FIG. 2.
Figure 4:
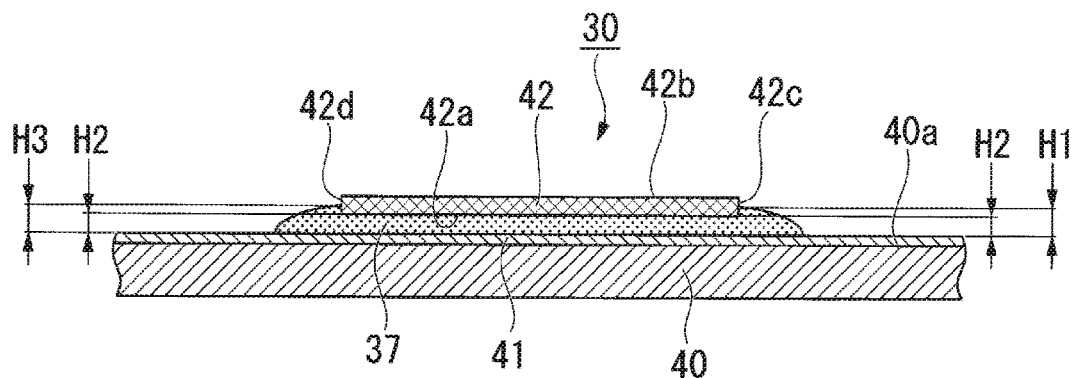
FIG. 4 is an enlarged view of a portion indicated by a sign P in FIG. 3.

FIG. 2 is a perspective view showing the rotation fluorescent plate 30. FIG. 3 is an A-A' sectional view of FIG. 2. FIG. 4 is an enlarged view of a portion indicated by a sign P in FIG. 3.

The rotation fluorescent plate 30 includes, as shown in FIG. 1, FIG. 2, and FIG. 4, the motor 50, a substrate 40, a reflection film 41, and the wavelength conversion element 42. The rotation fluorescent plate 30 emits the fluorescent light Y toward the same side as a side on which the blue light E is made incident. That is, the rotation fluorescent plate 30 is a reflection-type rotation fluorescent plate.

The substrate 40 is configured from a base material made of metal excellent in a heat radiation property such as aluminum or copper. The substrate 40 is enabled to rotate around a rotation axis 35 by the motor 50. The substrate 40 is a plate body having a circular plane shape. For example, the diameter of the substrate 40 is set to approximately 50 mm to 60 mm and the thickness of the substrate 40 is set to approximately 1 mm to 2 mm.

The wavelength conversion element 42 is configured from an inorganic phosphor material having an annular plane shape. The wavelength conversion element 42 is provided around the rotation axis 35 on one surface 40a side of the substrate 40. As shown in FIG. 4, the wavelength conversion element 42 includes a first surface 42a (a lower surface in FIG. 4) opposed to the one surface 40a of the substrate 40, a second surface 42b (an upper surface in FIG. 4) on the opposite side of the first surface 42a, a first side surface 42c (a right side surface in FIG. 4) that connects the first surface 42a to the second surface 42b, and a second side surface 42d (a left side surface in FIG. 4) opposed to the first side surface 42c. The first side surface 42c is a side surface configuring the outer circumference of the wavelength conversion element 42. The second side surface 42d is a side surface configuring the inner circumference of the wavelength conversion element 42. The first side surface 42c is equivalent to a first side surface section in the claims. The second side surface 42d is equivalent to a second side surface section in the claims.

The outer diameter of the wavelength conversion element 42 is set smaller than the outer diameter of the substrate 40. The wavelength conversion element 42 is excited by the blue light E emitted from the first light source 10 and emits the fluorescent light Y in the second wavelength band. The fluorescent light Y is yellow light including red light and green light.

The wavelength conversion element 42 includes, for example, yttrium/aluminum/garnet (YAG)-based phosphor. Referring to YAG:Ce as an example, as the wavelength conversion element 42, a material obtained by mixing material powder containing constituent elements such as $Y_2O_3$, $Al_2O_3$, and $CeO_3$ and causing solid phase reaction, Y—Al—O amorphous particles obtained by a wet method such as a co-precipitation method or a sol-gel method, YAG particles obtained by a vapor phase method such as a spray drying method, a flame pyrolysis method, or a thermal plasma method, and the like can be used.

The reflection film 41 is provided between the wavelength conversion element 42 and the substrate 40. The reflection film 41 is designed to reflect the fluorescent light Y at high efficiency. Therefore, the one surface 40a forming the reflection film 41 of the substrate 40 has high-precision plane roughness. Consequently, the reflection film 41 reflects most of the fluorescent light Y, which travels to the substrate 40 side, toward the upward direction in FIG. 1 (the opposite side of the substrate 40).

Since the blue light E formed by laser light is made incident on the wavelength conversion element 42, heat is generated in the wavelength conversion element 42. In this embodiment, the substrate 40 is rotated to temporally change an incident position of the blue light E in the wavelength conversion element 42. Consequently, the blue light B is prevented from being always irradiated on the same portion in the wavelength conversion element 42 to locally heat and deteriorate the wavelength conversion element 42.

As shown in FIG. 4, the wavelength conversion element 42 is fixed to the substrate 40 by a fixing member 37. In the case of this embodiment, an adhesive is used as the fixing member 37. The reflection film 41 is provided on the one surface 40a of the substrate 40. The fixing member 37 needs to be transparent to make the excitation light and the fluorescent light incident on the reflection film 41. As the fixing member 37, for example, silicone resin is used.

A part of the fixing member 37 is provided between the wavelength conversion element 42 and the substrate 40. Another part of the fixing member 37 protrudes to the outer circumference side of the wavelength conversion element 42 in a ring shape. Further, another part of the fixing member 37 protrudes to the inner circumference side of the wavelength conversion element 42 in a ring shape. In the fixing member 37, the portion protruding to the outer circumference side of the wavelength conversion element 42 swells further upward than the first surface 42a of the wavelength conversion element 42 and is in contact with the first side surface 42c of the wavelength conversion element 42. Therefore, with the upper surface of the reflection film 41 set as a reference plane, height H1 from the reference plane of the highest position of the fixing member 37 on the outer circumference side of the wavelength conversion element 42 is larger than height H2 from the reference plane of the first surface 42a of the wavelength conversion element 42.

Similarly, in the fixing member 37, the portion protruding to the inner circumference side of the wavelength conversion element 42 swells further upward than the first surface 42a of the wavelength conversion element 42 and is in contact with the second side surface 42d of the wavelength conversion element 42. Therefore, with the upper surface of the reflection film 41 set as the reference plane, height H3 from the reference plane of the highest position of the fixing member 37 on the inner circumference side of the wavelength conversion element 42 is larger than the height H2.

Referring back to FIG. 1, the first lens array 120 includes a plurality of first small lenses 122 for dividing light emitted from the dichroic mirror 80 into a plurality of partial light beams. The plurality of first small lenses 122 are arrayed in a matrix shape in a surface orthogonal to the illumination optical axis 100ax.

The second lens array 130 includes a plurality of second small lenses 132 corresponding to the plurality of first small lenses 122 of the first lens array 120. The second lens array 130 forms, in conjunction with the superimposition lens 150 at a post stage, images of the first small lenses 122 of the first lens array 120 in the vicinities of respective image forming regions of the liquid crystal light modulating device 400R, the liquid crystal light modulating device 400G, and the liquid crystal light modulating device 400B. The plurality of second small lenses 132 are arrayed in a matrix shape in a surface orthogonal to the illumination optical axis 100ax.

The polarization conversion element 140 converts partial light beams divided by the first lens array 120 into linearly polarized lights, polarization directions of which are aligned.

The superimposition lens 150 condenses the partial light beams emitted from the polarization conversion element 140 and superimposes the partial light beams one another in the vicinities of the respective image forming regions of the liquid crystal light modulating device 400R, the liquid crystal light modulating device 400G, and the liquid crystal light modulating device 400B. The first lens array 120, the second lens array 130, and the superimposition lens 150 configure an integrator optical system that equalizes an in-plane light intensity distribution of light emitted from the rotation fluorescent plate 30.

The color-separation light-guide optical system 200 includes a dichroic mirror 210, a dichroic mirror 220, a reflection mirror 230, a reflection mirror 240, a reflection mirror 250, a relay lens 260, and a relay lens 270. The color-separation light-guide optical system 200 separates the white light W obtained from the first illumination device 100 and the second illumination device 102 into red light R, green light G, and blue light B and guides the red light R, the green light G, and the blue light B to the liquid crystal modulating devices 400R, 400G, and 400B corresponding to the red light R, the green light G, and the blue light B. A field lens 300R, a field lens 300G, and a field lens 300B are disposed between the color-separation light-guide optical system 200 and the liquid crystal light modulating device 400R, the liquid crystal light modulating device 400G, and the liquid crystal light modulating device 400B.

The dichroic mirror 210 is a dichroic mirror that allows a red light component to pass and reflects a green light component and a blue light component. The dichroic mirror 220 is a dichroic mirror that reflects the green light component and allows the blue light component to pass. The reflection mirror 230 is a reflection mirror that reflects the red light component. The reflection mirror 240 and the reflection mirror 250 are reflection mirrors that reflect the blue light component.

Red light passed through the dichroic mirror 210 is reflected on the reflection mirror 230 and passes through the field lens 300R to be made incident on the image forming region of the liquid crystal light modulating device 400R for red light. Green light reflected by the dichroic mirror 210 is further reflected by the dichroic mirror 220 and passes through field lens 300G to be made incident on the image forming region of the liquid crystal light modulating device 400G for green light. Blue light passed through the dichroic mirror 220 passes through the relay lens 260, the reflection mirror 240 on an incident side, the relay lens 270, the reflection mirror 250 on an emission side, and the field lens 300B to be made incident on the image forming region of the liquid crystal light modulating device 400B for blue light.

The liquid crystal light modulating device 400R, the liquid crystal light modulating device 400G, and the liquid crystal light modulating device 400B modulate the incident color lights according to image information and form color images corresponding to the color lights. Although not shown in the figure, incident-side polarizing plates are disposed on light incident sides of the liquid crystal light modulating device 400R, the liquid crystal light modulating device 400G, and the liquid crystal light modulating device 400B. Emission-side polarizing plates are disposed on light emission sides of the liquid crystal light modulating device 400R, the liquid crystal light modulating device 400G, and the liquid crystal light modulating device 400B.

The cross dichroic prism 500 combines image lights emitted from the liquid crystal light modulating device 400R, the liquid crystal light modulating device 400G, and the liquid crystal light modulating device 400B to form a color image. The cross dichroic prism 500 is formed in a substantially square shape in plan view obtained by sticking together four right-angle prisms. Dielectric multilayer films are formed on a substantially-X shape interface where the right-angle prisms are stuck together.

The color image emitted from the cross dichroic prism 500 is enlarged and projected by the projection optical system 600 to form an image on a screen SCR. The projection optical system 600 is configured by a plurality of projection lenses 6.

In the rotation fluorescent plate 30, the wavelength conversion element 42 is provided around the rotation axis 35 on the one surface 40a side of the substrate 40. Therefore, while the substrate 40 rotates, a centrifugal force acts on the wavelength conversion element 42. When excitation light is applied on the wavelength conversion element 42, the temperature of the fixing member 37 rises according to heat generation of the wavelength conversion element 42. When the temperature of the fixing member 37 is equal to or higher than a certain temperature, a fixing force of the fixing member 37 sometimes decreases. When the fixing force of the wavelength conversion element 42 decreases in this way, the wavelength conversion element 42 is likely to come off the substrate 40.

On the other hand, in this embodiment, in the fixing member 37, the portion protruding to the outer circumference side of the wavelength conversion element 42 is in contact with the first side surface 42c. In the fixing member 37, the portion protruding to the inner circumference side of the wavelength conversion element 42 is in contact with the second side surface 42d. Therefore, the wavelength conversion element 42 is held by the fixing member 37 from both of the side of the first side surface 42c and the side of the second side surface 42d. Consequently, the wavelength conversion element 42 less easily comes off the substrate 40. A part of the fixing member 37 is interposed between the wavelength conversion element 42 and the substrate 40. Therefore, it is possible to increase a fixing force of the wavelength conversion element 42 and the substrate 40.

In the first embodiment, when viewed from a direction parallel to the rotation axis 35, the fixing member 37 is in contact with the first side surface 42c over the entire circumference of the wavelength conversion element 42. That is, the fixing member 37 is in contact with the first side surface 42c in a plurality of positions. However, the fixing member 37 does not necessarily have to be in contact with the first side surface 42c over the entire circumference of the wavelength conversion element 42.

(First Modification)

Figure 5:
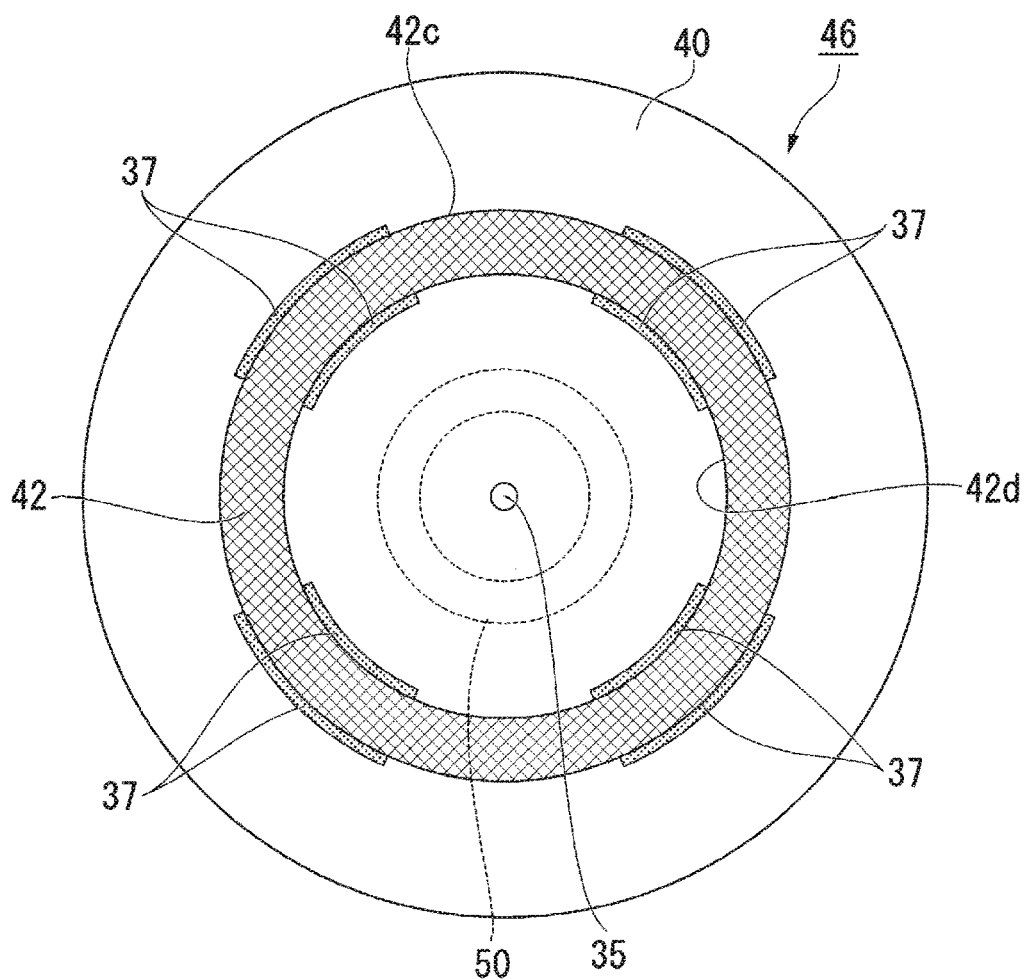
FIG. 5 is a plan view of a wavelength conversion device in a first modification.

FIG. 5 is a plan view of a wavelength conversion device in a first modification.

As shown in FIG. 5, when viewed from the direction parallel to the rotation axis 35, the fixing member 37 may be in contact with the first side surface 42c in a part of the first side surface 42c. In a rotation fluorescent plate 46 in the first modification, the entire circumference (360°) of the wavelength conversion element 42 is imaginarily divided into eight regions having the equal angle (45°). On the outer circumference side of the wavelength conversion element 42, a region where the fixing member 37 is in contact with the first side surface 42c and a region where the fixing member 37 is not in contact with the first side surface 42c are alternately provided. Similarly, on the inner circumference side of the wavelength conversion element 42, a region where the fixing member 37 is in contact with the second side surface 42d and a region where the fixing member 37 is not in contact with the second side surface 42d are alternately provided. In this way, when viewed from the direction parallel to the rotation axis 35, the fixing member 37 may be in contact with the second side surface 42d in a plurality of positions or may be in contact with the second side surface 42d in at least a part of the second side surface 42d. When the fixing member 37 is in contact with the first side surface 42c or the second side surface 42d of the wavelength conversion element 42 in a plurality of positions, the wavelength conversion element 42 much less easily comes off.

The first illumination device 100 in this embodiment includes the rotation fluorescent plate 30 having the configuration explained above. Therefore, it is possible to realize an illumination device having high reliability. The projector 1 in this embodiment includes the first illumination device 100 having the configuration explained above. Therefore, it is possible to realize a projector having high reliability.

Second Embodiment

A second embodiment of the present invention is explained below with reference to FIG. 6.

A basic configuration of a projector in the second embodiment is the same as the basic configuration in the first embodiment. The configuration of a rotation fluorescent plate is different from the configuration in the first embodiment. Therefore, explanation of the entire projector is omitted. Only the rotation fluorescent plate is explained.

Figure 6:
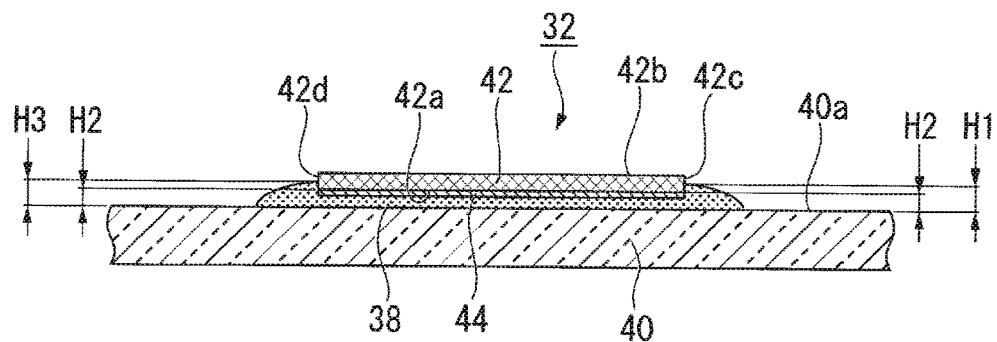
FIG. 6 is a sectional view of a wavelength conversion device in a second embodiment.

FIG. 6 is a sectional view of a wavelength conversion device in the second embodiment. FIG. 6 corresponds to FIG. 4 in the first embodiment.

In FIG. 6, components common to the drawings referred to in the first embodiment are denoted by the same reference numerals and signs and explanation of the components is omitted.

In the rotation fluorescent plate 30 in the first embodiment, the reflection film 41 is provided on one surface of the substrate 40. On the other hand, as shown in FIG. 6, in a rotation fluorescent plate 32 in the second embodiment, a reflection film 44 is provided on the first surface 42a of the wavelength conversion element 42. The wavelength conversion element 42, on the first surface 42a of which the reflection film 44 is provided, is fixed to the substrate 40 by a fixing member 38. In this case, excitation light and fluorescent light do not need to be transmitted through the fixing member 38. Therefore, the fixing member 38 does not need to be transparent. As the fixing member 38, for example, silver paste or solder is used. When the fixing member 38 of the silver paste, the solder, or the like is used, thermal conductivity is high compared with when a fixing member of resin or the like is used. Therefore, it is easy to allow heat of the wavelength conversion element 42 to escape to the substrate 40.

A part of the fixing member 38 is provided between the wavelength conversion element 42 and the substrate 40. Another part of the fixing member 38 protrudes to the outer circumference side of the wavelength conversion element 42 in a ring shape. Further, another part of the fixing member 38 protrudes to the inner circumference side of the wavelength conversion element 42 in a ring shape. In the fixing member 38, the portion protruding to the outer circumference side of the wavelength conversion element 42 is in contact with the first side surface 42c of the wavelength conversion element 42. Therefore, with the one surface 40a of the substrate 40 set as a reference plane, the height H1 from the reference plane of the highest position of the fixing member 38 on the outer circumference side of the wavelength conversion element 42 is larger than the height H2 from the reference plane of the first surface 42a of the wavelength conversion element 42.

Similarly, in the fixing member 38, the portion protruding to the inner circumference side of the wavelength conversion element 42 is in contact with the second side surface 42d of the wavelength conversion element 42. Therefore, with the one surface 40a of the substrate 40 set as the reference plane, the height H3 from the reference plane of the highest position of the fixing member 38 on the inner circumference side of the wavelength conversion element 42 is larger than the height H2 from the reference plane of the first surface 42a of the wavelength conversion element 42.

In this embodiment, the same effect as the effect in the first embodiment is obtained that the wavelength conversion element less easily comes off the substrate.

Third Embodiment

A third embodiment of the present invention is explained below with reference to FIG. 7.

A basic configuration of a projector in the third embodiment is the same as the basic configuration in the first embodiment. The configuration of a rotation fluorescent plate is different from the configuration in the first embodiment. Therefore, explanation of the entire projector is omitted. Only the rotation fluorescent plate is explained.

Figure 7:
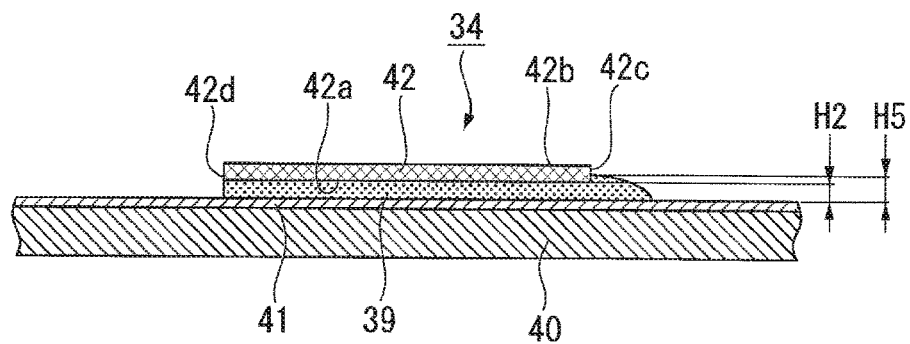
FIG. 7 is a sectional view of a wavelength conversion device in a third embodiment.

FIG. 7 is a sectional view of a wavelength conversion device in the third embodiment. FIG. 7 corresponds to FIG. 4 in the first embodiment.

In FIG. 7, components common to the drawings referred to in the first embodiment are denoted by the same reference numerals and signs and explanation of the components is omitted.

In the rotation fluorescent plate 30 in the first embodiment, the fixing member 37 is in contact with both of the first side surface 42c and the second side surface 42d of the wavelength conversion element 42. On the other hand, as shown in FIG. 7, in a rotation fluorescent plate 34 in the third embodiment, a fixing member 39 swells further upward than the first surface 42a on the outer circumference side of the wavelength conversion element 42 and is in contact with the first side surface 42c of the wavelength conversion element 42. The fixing member 39 does not protrude to the inner side of the wavelength conversion element 42 and is not in contact with the second side surface 42d of the wavelength conversion element 42.

The other configurations are the same as the configurations in the first embodiment.

In this embodiment, the same effect as the effect in the first embodiment is obtained that the wavelength conversion element less easily comes off the substrate.

Fourth Embodiment

A fourth embodiment of the present invention is explained below with reference to FIG. 8.

A basic configuration of a projector in the fourth embodiment is the same as the basic configuration in the first embodiment. The configuration of a rotation fluorescent plate is different from the configuration in the first embodiment. Therefore, explanation of the entire projector is omitted. Only the rotation fluorescent plate is explained.

Figure 8:
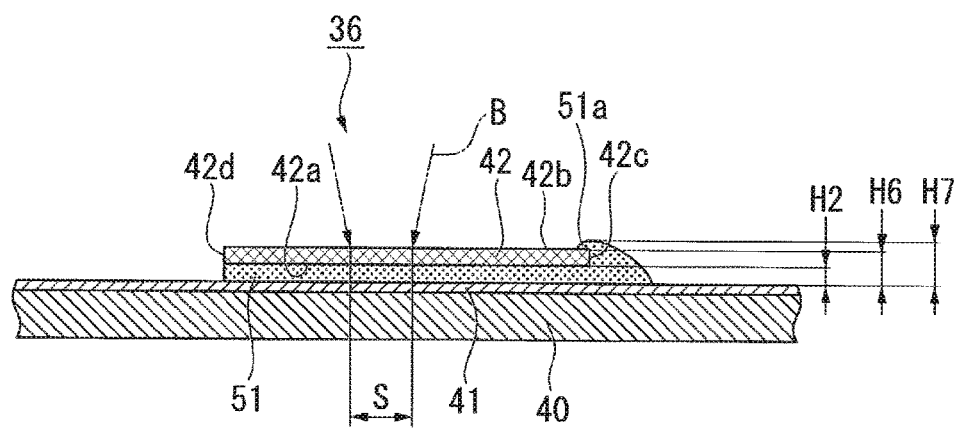
FIG. 8 is a sectional view of a wavelength conversion device in a fourth embodiment.

FIG. 8 is a sectional view of a wavelength conversion device in the fourth embodiment. FIG. 8 corresponds to FIG. 4 in the first embodiment.

In FIG. 8, components common to the drawings referred to in the first embodiment are denoted by the same reference numerals and signs and explanation of the components is omitted.

In the rotation fluorescent plate 30 in the first embodiment, the fixing member 37 is in contact with the first side surface 42c of the wavelength conversion element 42. On the other hand, as shown in FIG. 8, in a rotation fluorescent plate 36 in the fourth embodiment, a fixing member 51 swells further upward than the first surface 42a on the outer circumference side of the wavelength conversion element 42 and is in contact with the first side surface 42c of the wavelength conversion element 42. Further, the fixing member 51 includes a projecting section 51a extending from the first side surface 42c of the wavelength conversion element 42 to the side of the second surface 42b. When viewed from the direction parallel to the rotation axis 35, the projecting section 51a overlaps the second surface 42b and is in contact with the second surface 42b. With the upper surface of the reflection film 41 set as a reference plane, height H7 from the reference plane of the highest position of the fixing member 51 on the outer circumference side of the wavelength conversion element 42 is larger than the height H2 from the reference plane of the first surface 42a of the wavelength conversion element 42 and larger than height H6 from the reference plane of the second surface 42b of the wavelength conversion element 42.

The other configurations are the same as the configurations in the first embodiment.

The fixing member 51 is provided on the outer side of a spot S of excitation light B on the second surface 42b of the wavelength conversion element 42. Therefore, the excitation light B is not irradiated on the fixing member 51.

In this embodiment, apart of the fixing member 51 extends from the side of the first side surface 42c to the side of the second surface 42b of the wavelength conversion element 42 and, when viewed from the direction parallel to the rotation axis 35, overlaps the second surface 42b. Therefore, compared with when a part of the fixing member 51 does not overlap the second surface 42b, the wavelength conversion element 42 much less easily comes off. Since the excitation light B is not applied on the fixing member 51, it is possible to prevent the fixing member 51 from being damaged by the excitation light B.

Fifth Embodiment

A fifth embodiment of the present invention is explained with reference to FIG. 9.

A basic configuration of a projector in the fifth embodiment is the same as the basic configuration in the first embodiment. The configuration of a rotation fluorescent plate is different from the configuration in the first embodiment. Therefore, explanation of the entire projector is omitted. Only the rotation fluorescent plate is explained.

Figure 9:
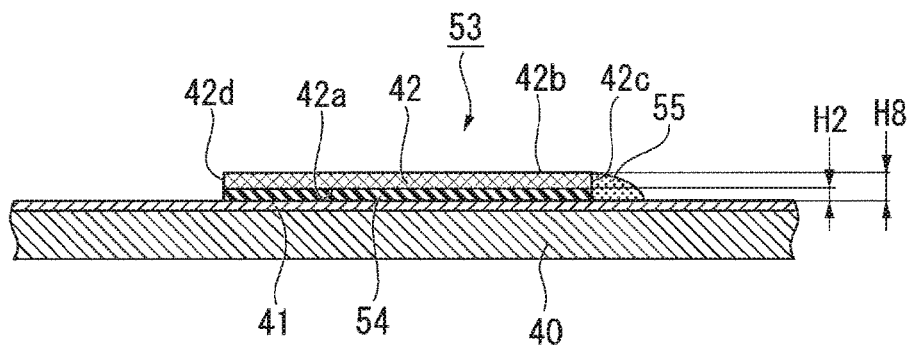
FIG. 9 is a sectional view of a wavelength conversion device in a fifth embodiment.

FIG. 9 is a sectional view of a wavelength conversion device in the fifth embodiment. FIG. 9 corresponds to FIG. 4 in the first embodiment.

In FIG. 9, components common to the drawings referred to in the first embodiment are denoted by the same reference numerals and signs and explanation of the components is omitted.

In the rotation fluorescent plate 30 in the first embodiment, a part of the fixing member 37 is provided between the wavelength conversion element 42 and the substrate 40. On the other hand, as shown in FIG. 9, in a rotation fluorescent plate 53 in the fifth embodiment, thermal conductive grease 54 is provided between the wavelength conversion element 42 and the substrate 40 instead of the fixing member 37. The thermal conductive grease 54 is obtained by dispersing particles of metal such as copper, silver, or aluminum having high thermal conductivity or a metal oxide such as alumina, magnesium oxide, or aluminum nitride in grease formed from denatured silicone or the like. Since the thermal conductive grease 54 is interposed between the wavelength conversion element 42 and the substrate 40, compared with when an adhesive is interposed, thermal conductivity between the wavelength conversion element 42 and the substrate 40 decreases. It is possible to improve a heat radiation effect of the wavelength conversion element 42.

A fixing member 55 swells further upward than the first surface 42a on the outer circumference side of the wavelength conversion element 42 and is in contact with the first side surface 42c of the wavelength conversion element 42. With the upper surface of the reflection film 41 set as a reference plane, height H8 from the reference plane of the highest position of the fixing member 55 is larger than the height H2 from the reference plane of the first surface 42a of the wavelength conversion element 42. In the case of this embodiment, the highest position of the fixing member 55 coincides with the height of the second surface 42b of the wavelength conversion element 42. However, the fixing member 55 is not limited to this configuration.

In this embodiment, the wavelength conversion element 42 less easily comes off the substrate. Further, a heat radiation effect of the wavelength conversion element 42 is improved.

Sixth Embodiment

A sixth embodiment of the present invention is explained below with reference to FIG. 10.

A basic configuration of a projector in the sixth embodiment is the same as the basic configuration in the first embodiment. The configuration of a rotation fluorescent plate is different from the configuration in the first embodiment. Therefore, explanation of the entire projector is omitted. Only the rotation fluorescent plate is explained.

Figure 10:
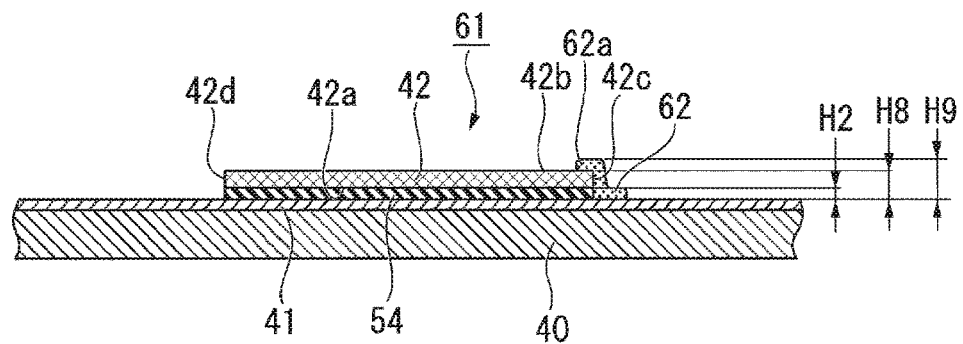
FIG. 10 is a sectional view of a wavelength conversion device in a sixth embodiment.

FIG. 10 is a sectional view of a wavelength conversion device in the sixth embodiment. FIG. 10 corresponds to FIG. 4 in the first embodiment.

In FIG. 10, components common to the drawings referred to in the first embodiment are denoted by the same reference numerals and signs and explanation of the components is omitted.

As shown in FIG. 10, in a rotation fluorescent plate 61 in the sixth embodiment, as in the fifth embodiment, the thermal conductive grease 54 is provided between the wavelength conversion element 42 and the substrate 40. A fixing member 62 swells further upward than the first surface 42a on the outer circumference side of the wavelength conversion element 42 and is in contact with the first side surface 42c of the wavelength conversion element 42. Further, the fixing member 62 includes a projecting section 62a extending from the first side surface 42c to the side of the second surface 42b of the wavelength conversion element 42. When viewed from the direction parallel to the rotation axis 35, the projecting section 62a overlaps the second surface 42b and is in contact with the second surface 42b. With the upper surface of the reflection film 41 set as a reference plane, height H9 from the reference plane of the highest position of the fixing member 62 is larger than the height H2 from the reference plane of the first surface 42a of the wavelength conversion element 42 and is larger than the height H8 from the reference plane of the second surface 42b of the wavelength conversion element.

The other configurations are the same as the configurations in the fifth embodiment.

In this embodiment as well, the wavelength conversion element 42 less easily comes off the substrate. Further, the heat radiation effect of the wavelength conversion element 42 is improved.

(Second modification)

In the fourth embodiment and the sixth embodiment, apart of the fixing member is in contact with the second surface of the wavelength conversion element. However, the present invention is not limited to this.

Figure 11:
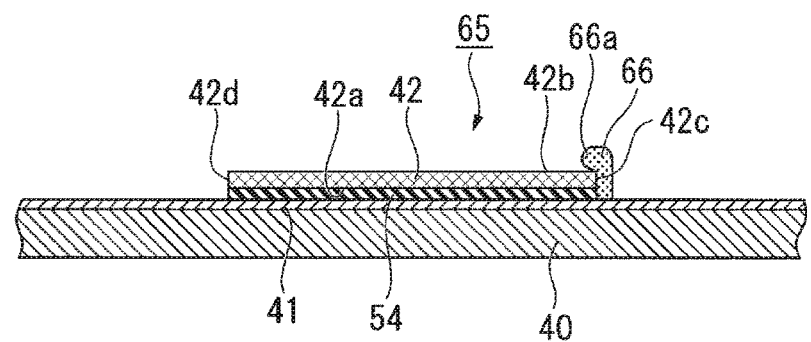
FIG. 11 is a sectional view of a wavelength conversion device in a second modification.

FIG. 11 is a sectional view of a wavelength conversion device in a second modification. FIG. 11 corresponds to FIG. 10 in the sixth embodiment.

FIG. 11 is a sectional view of a wavelength conversion device in a second modification. FIG. 11 corresponds to FIG. 10 in the sixth embodiment.

As shown in FIG. 11, in a rotation fluorescent plate 65 in the second modification, a fixing member 66 includes a projecting section 66a extending from the first side surface 42c to the side of the second surface 42b of the wavelength conversion element 42. When viewed from the direction parallel to the rotation axis 35, the projecting section 66a overlaps the second surface 42b but is not in contact with the second surface 42b.

In this modification as well, the wavelength conversion element 42 less easily comes off the substrate.

Note that the technical scope of the present invention is not limited to the embodiments. It is possible to add various changes in a range not departing from the spirit of the present invention.

For example, in the embodiments, the example of the illumination device including the reflection-type rotation fluorescent plate is explained. However, the illumination device may be an illumination device including a transmission-type rotation fluorescent plate. In this case, both of the substrate and the fixing member of the rotation fluorescent plate need to have light transmittance.

Besides, specific descriptions of the shapes, the numbers, the dispositions, the materials, and the like of the components of the wavelength conversion device, the illumination device, and the projector are not limited to the embodiments and can be changed as appropriate. In the embodiments, the example is explained in which the illumination device according to the present invention is mounted on the projector in which the liquid crystal light valve is used. However, the present invention is not limited to this. The illumination device may be mounted on a projector in which a digital micro mirror device is used as a light modulating device.

In the embodiments, the example is explained in which the illumination device according to the present invention is mounted on the projector. The present invention is not limited to this. The illumination device according to the present invention can also be applied to a lighting fixture, a headlight of an automobile, and the like.

In the embodiments, the phosphor layer is used as the wavelength conversion element. However, the present invention is not limited to this. For example, a quantum rod may be used as the wavelength conversion element.

The entire disclosure of Japanese Patent Application No. 2015-210052, filed on Oct. 26, 2015 is expressly incorporated by reference herein.

What is claimed is:

1. A wavelength conversion device comprising:
   a substrate capable of rotating around a rotation axis;
   a wavelength conversion element provided around the rotation axis on one surface of the substrate; and
   an adhesive layer that fixes the wavelength conversion element to the substrate, wherein
   the wavelength conversion element includes a first surface opposed to the one surface of the substrate, a second surface on an opposite side of the first surface, and a first side surface that connects the first surface to the second surface,
   the adhesive layer is in direct contact with the first side surface in at least a part of the first side surface when viewed from a direction parallel to the rotation axis,
   the adhesive layer includes a projecting section extending from the first side surface to the second surface, and, when viewed from the direction parallel to the rotation axis, the projecting section overlaps the second surface and is in direct contact with the second surface,
   the wavelength conversion element is a phosphor layer, and the adhesive layer is in direct contact with the second surface of the phosphor layer, and
   at least a part of the second surface is not overlapped with any part of the adhesive layer.

2. The wavelength conversion device according to claim 1, wherein a part of the adhesive layer is provided between the wavelength conversion element and the substrate.

3. The wavelength conversion device according to claim 2, wherein
   the wavelength conversion element has an annular shape and further includes a second side surface opposed to the first side surface, and
   the fixing adhesive layer is in direct contact with the second side surface in at least a part of the second side surface when viewed from the direction parallel to the rotation axis.

4. The wavelength conversion device according to claim 1, wherein the adhesive layer is in contact with the first side surface in a plurality of positions when viewed from the direction parallel to the rotation axis.

5. An illumination device comprising:
   the wavelength conversion device according to claim 1; and
   a light source that emits excitation light for exciting the wavelength conversion element.

6. A projector comprising:
   the illumination device according to claim 5;
   a light modulating device that modulates, according to image information, light emitted from the illumination device; and
   a projection optical system that projects the light modulated by the light modulating device.

7. A wavelength conversion device comprising:
   a substrate capable of rotating around a rotation axis;
   a wavelength conversion element provided around the rotation axis on one surface of the substrate; and
   an adhesive layer that fixes the wavelength conversion element to the substrate, wherein
   the wavelength conversion element includes a first surface opposed to the one surface of the substrate, a second surface on an opposite side of the first surface, and a first side surface that connects the first surface to the second surface, the adhesive layer is in direct contact with the first side surface in at least a part of the first side surface when viewed from a direction parallel to the rotation axis, the adhesive layer includes a projecting section extending from the first side surface to the second surface, and, when viewed from the direction parallel to the rotation axis, the projecting section overlaps the second surface and is in direct contact with the second surface, the wavelength conversion element is a phosphor layer, and the adhesive layer is in direct contact with the second surface of the phosphor layer, and the phosphor layer has a second side surface opposed to the first side surface, and the second side surface is not overlapped by any part of the adhesive layer.

8. The wavelength conversion device according to claim 7, wherein a part of the adhesive layer is provided between the wavelength conversion element and the substrate.

9. The wavelength conversion device according to claim 7, wherein the adhesive layer is in contact with the first side surface in a plurality of positions when viewed from the direction parallel to the rotation axis.

10. An illumination device comprising:
the wavelength conversion device according to claim 7; and
a light source that emits excitation light for exciting the wavelength conversion element.

11. A projector comprising:
the illumination device according to claim 10;
a light modulating device that modulates, according to image information, light emitted from the illumination device; and
a projection optical system that projects the light modulated by the light modulating device.

* * * * *